(12) United States Patent
Ezell

(10) Patent No.: US 8,300,559 B2
(45) Date of Patent: Oct. 30, 2012

(54) SYSTEM AND METHOD FOR MONITORING CALL FLOW IN HETEROGENEOUS ENVIRONMENTS

(75) Inventor: Joel Ezell, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 1027 days.

(21) Appl. No.: 12/266,701

(22) Filed: Nov. 7, 2008

(65) Prior Publication Data
US 2010/0118742 A1 May 13, 2010

(51) Int. Cl.
H04L 12/16 (2006.01)
(52) U.S. Cl. ........................................ 370/261
(58) Field of Classification Search .......................... None
See application file for complete search history.

(56) References Cited

U.S. PATENT DOCUMENTS

| 6,553,032 | B1 * | 4/2003 | Farley et al. | 370/394 |
| 6,947,410 | B1 * | 9/2005 | Schwartz et al. | 370/352 |
| 7,369,540 | B1 | 5/2008 | Giroti | |
| 2003/0108002 | A1 * | 6/2003 | Chaney et al. | 370/261 |
| 2004/0153552 | A1 | 8/2004 | Trossen et al. | |
| 2007/0124458 | A1 | 5/2007 | Kumar | |
| 2007/0143858 | A1 | 6/2007 | Hearty | |

OTHER PUBLICATIONS

U.S. Appl. No. 11/781,012, Ezell.

* cited by examiner

Primary Examiner — Chirag Shah
Assistant Examiner — Minh-Trang Nguyen

(57) ABSTRACT

The call states of all devices in a call are monitored and reported even when the devices belong to networks that use different types of call identifiers. A first device and a second device are different types of devices selected from a group of types comprising: a legacy device type, a SIP basic device type, and a SIP advanced device type. In response to a request from an application to monitor the first device and a request to establish a call between the first device and the second device, a Universal Call Identifier (UCID) is generated for the call and the call is established. A request to monitor the second device is sent using the UCID. When a change in the call state of the second device is detected, the change of the call state is reported to the application based on the UCID.

23 Claims, 8 Drawing Sheets

SYSTEM AND METHOD FOR MONITORING CALL FLOW IN HETEROGENEOUS ENVIRONMENTS

TECHNICAL FIELD

The system and method relate to call flow-monitoring systems and in particular to systems and methods for monitoring heterogeneous environments.

BACKGROUND

Currently, legacy telephony systems and Session Initiation Protocol (SIP) systems are intermixed on various networks. To further complicate the matter, SIP networks may have a mix of basic SIP devices (RFC 3261) and advanced SIP devices (RFC 4235, draft-mahy-sip-remote-cc). In a mixed-environment, existing systems are able to monitor a specific endpoint and are able to detect events associated with the specific endpoint However, existing systems are unable to monitor events using a single API call on one or more additional devices where there is a call between the specific endpoint and the second device if the endpoint and the device are not the same type of devices (either legacy, SIP basic, or SIP advanced). The second device cannot be tracked because legacy, SIP basic, and the SIP advanced systems use different call identifiers.

For example, Patent Application Publication 2007/0143858 describes a system for monitoring events associated with individual SIP devices. A programming interface can be used to monitor a specific SIP device for specific events associated with the device. As calls are made either to or from the monitored SIP device, the system can detect events on the other SIP device as long as the monitored SIP device and the other SIP device are both SIP basic devices. If the call is to/from a legacy device or a SIP advanced device, the system cannot detect events happening to the other device because the call information does not flow through the Signal Path Manager.

SUMMARY

The system and method are directed to solving these and other problems and disadvantages of the prior art. A first device and a second device are different types of devices selected from a group of types comprising: a legacy device type, a SIP basic device type, and a SIP advanced device type. In response to a request from an application to monitor the first device and a request to establish a call between the first device and the second device, a Universal Call Identifier (UCID) is generated for the call and the call is established between the first device and the second device. A request to monitor the second device is sent using the UCID. When a change in the call state of the second device is detected, the change of the call state is reported to the application based on the UCID.

BRIEF DESCRIPTION OF THE DRAWING

These and other features and advantages of the system and method will become more apparent from considering the following description of an illustrative embodiment of the system and method together with the drawing, in which.

DETAILED DESCRIPTION

Figure 1:
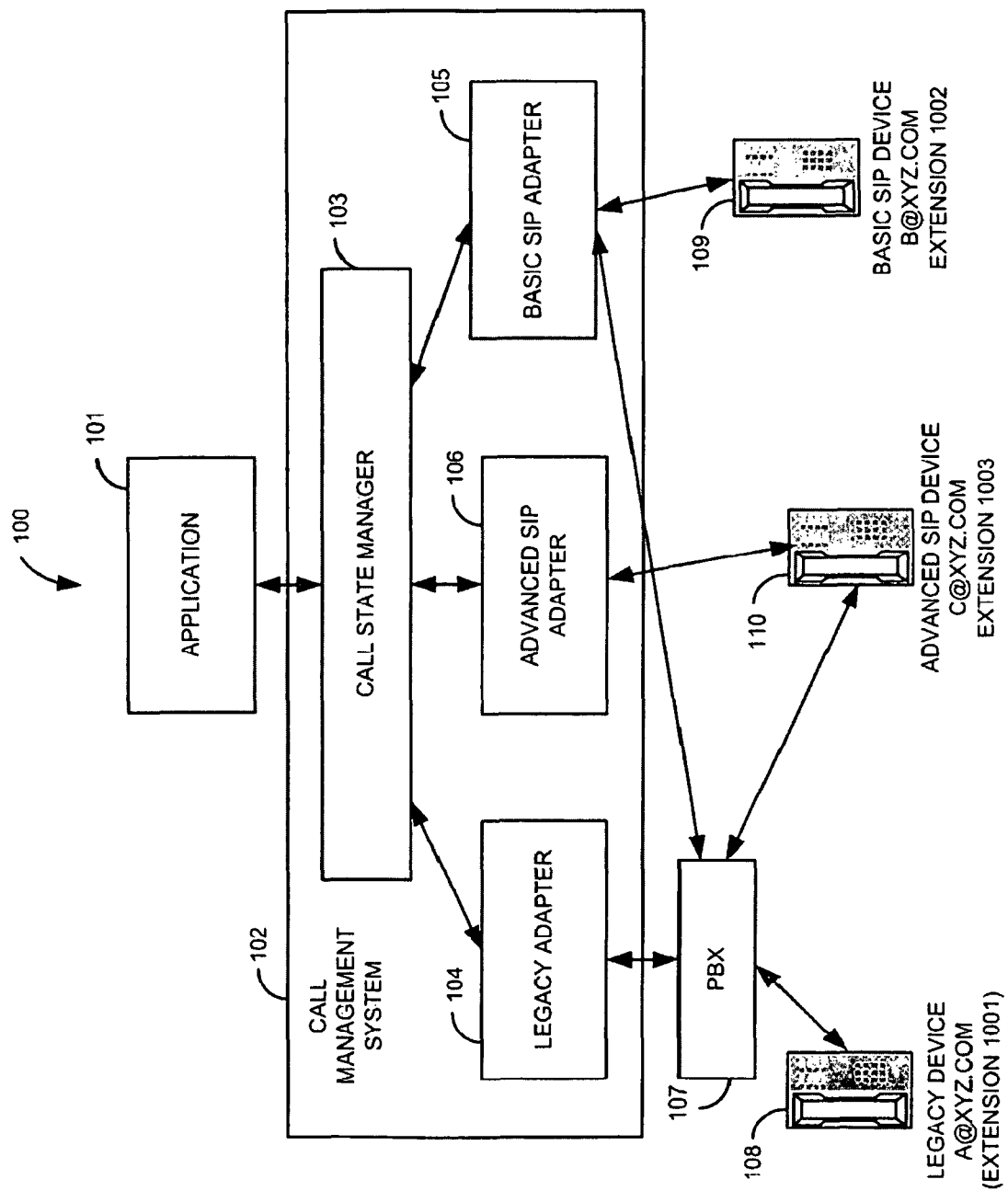
FIG. 1 is a block diagram illustrating a system for monitoring call state in a heterogeneous environment.

FIG. 1 is a block diagram illustrating a system 100 for monitoring call state in a heterogeneous environment. The system 100 comprises an application 101, a call management system 102, a Private Branch Exchange (PBX) 107, a legacy device 108, a basic SIP device 109, and an advanced SIP device 110. The call management system 102 further comprises a call state manager 103, a legacy adapter 104, a basic SIP adapter 105, and an advanced SIP adapter 106. Illustratively, the application 101, the call management system 102, the call state manager 103, the legacy adapter 104, the basic SIP adapter 105, the advanced SIP adapter 106, and the PBX 107 are stored-program-controlled entities, such as a computer, which perform the method of FIGS. 2-7 by executing programs stored in storage media, such as memory or disk.

The application 101 could be any application that needs to monitor or make a call, such as a soft telephone, a telephony application, a telephone, a calendaring application, an application running on a Personal Computer (PC), and the like. The call management system 102 could be any device that can process call related information, such as a PC, a PBX, a router, a gateway, a SIP application server, and the like. The legacy adapter 104 can be any device that supports legacy devices 108 and can talk to the PBX 107, such as a PBX, a router, a gateway, a switch, and the like. The basic SIP adapter 105 can be any device that can process basic SIP messages, a SIP B2BUA device, and the like. The advanced SIP adapter 106 can be any device that can process advanced SIP messages, such as a PBX, a server, a gateway, and the like. The PBX 107 can be any device that can route calls between devices (108-110), such as a central office switch, a router, and the like.

The legacy device 108 can be any non-SIP device, such as an analog telephone, an ISDN telephone, an ISDN device, a Digital Communication Protocol (DCP) device, and the like. The basic SIP device 109 can be any type of device that supports basic SIP, such as a SIP telephone, a SIP device, a Personal Digital Assistant (PDA), and the like. The advanced SIP device 110 can be any type of device that supports advance SIP, such as an advanced SIP telephone, an advanced SIP device, a PDA, and the like.

In an illustrative scenario the call state manager 103 receives a request from an application 101 to monitor a legacy device 108, and it does so in a conventional manner. A request is then received to establish a call between the legacy device 108 and the basic SIP device 109. The call request can be made from the application 101, the legacy device 108, the basic SIP device 109, and the like. In this example, the request to establish the call is received from the application 101. The request to establish the call is received at the call state manager 103. The call state manager 103 sends the request to establish the call to the PBX 107 via the legacy adapter 104. The PBX 107 generates the Universal Call Identifier (UCID) for the call between the legacy device 108 and the basic SIP device 109.

The UCID is a unique identifier that identifies the call; The UCID allows the application 101 to track changes in call state for all devices 108-110 on the call. In other examples, based on the origination of the call, the UCID can be generated by other devices such as: the legacy adapter 104, the advanced SIP adapter 106, the basic SIP adapter 105, the advanced SIP device 110, and the like. The UCID for the call between the legacy device 108 and the basic SIP device 109 is sent from the PBX 107 and received at the call state manager 103. The call state manager 103 generates a request which is sent to the basic SIP adapter 105 to monitor the basic SIP device 109. By using the UCID to monitor the legacy device 108 and the basic SIP device 109, the application will be notified of any change in call state on either device with the same identifier (UCID or CIDX). Without the UCID, the application 101 would receive different call identifiers when monitoring the legacy device 108 and the basic SIP device because the legacy adapter 104 and the basic adapter 105 use different call identifiers for the same call. Not having the same call identifier causes the application 101 to not be able to correlate the two calls.

The legacy adapter 104 establishes the call by directing the PBX 107 to establish the call between the legacy device 108 and the basic SIP device 109. The call state manager 103 receives a notice of a change in the call state of the basic SIP device 109 from the basic SIP adapter 105. The basic SIP adapter 105 is aware of changes in call state by virtue of the fact that basic SIP adapter 105 is a B2BUA in the signaling path between the PBX 107 and the basic SIP device 109. The notice of a change in the call state of the basic SIP device 109 can be based on a variety of events such as: when the basic SIP device 109 accepts or answers a call, when the user of the basic SIP device conferences a new device into the call, when the user puts the call on hold, when the user takes the call off a hold, when the call to the basic SIP device 109 is forwarded to another device, and the like. The call state manager 103 reports the change in the call state of the basic SIP device 109 to the application 101 based on the UCID.

In the examples in FIGS. 2-7, each of the devices (108-110) has both an alphanumeric address and a numeric address. The legacy device 108 has an alphanumeric address of a@xyz.com and a numeric address of 1001. The basic SIP device 109 has an alphanumeric address of b@xyz.com and a numeric address of 1002. The advanced SIP device 110 has an alphanumeric address of c@xyz.com and a numeric address of 1003.

Figure 2:
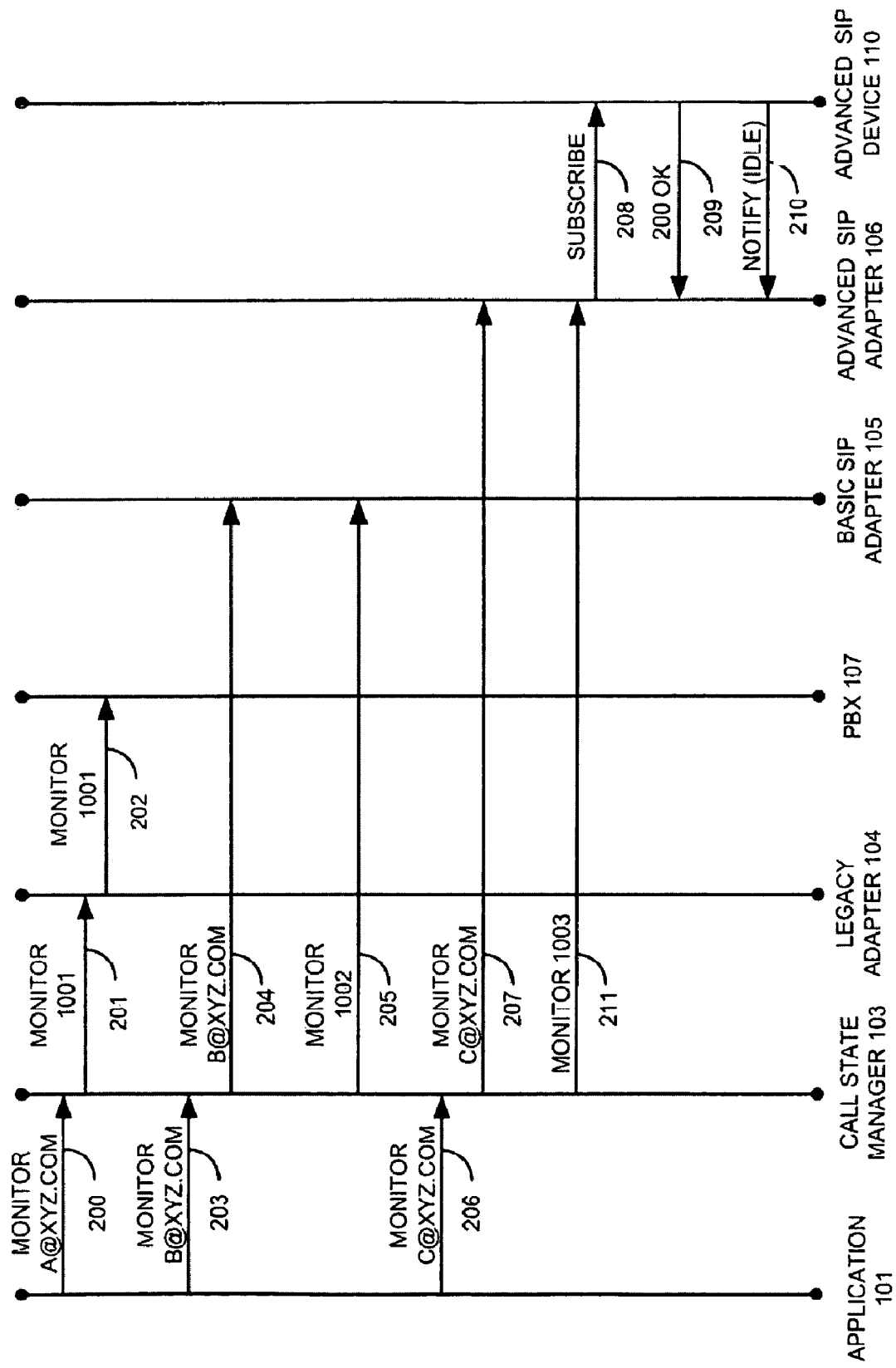
FIG. 2 is a flow diagram of a method for monitoring a legacy device, a basic SIP device, and an advanced SIP device.

FIG. 2 shows three separate examples of how to conventionally affect a request to monitor one of the devices (108-110). The application 101 sends 200 a request to monitor the legacy device 108 (a@xyz.com) and the call state manager 103 receives the request to monitor the legacy device 108. The call state manager 103 translates the requested address of a@xyz.com into 1001 so that the PBX 107 can monitor the legacy device 108. The call state manager 103 sends 201 the request to monitor the legacy device 108 to the legacy adapter 104. The legacy adapter 104 sends 202 the request to monitor the legacy device 108 to the PBX 107. Upon PBX 107 receiving the request to monitor the legacy device 108 in step 202, the application 101 is ready to monitor the legacy device 108.

The application 101 sends 203 a request to monitor the basic SIP device 109 (a@xyz.com) and the call state manager 103 receives the request to monitor the basic SIP device 109. Since the basic SIP adapter 105 can monitor both the alphanumeric address (b@xyz.com) and the numeric address (1002) for the basic SIP device 109, the call state manager 103 sends two monitor messages (204 and 205) to the basic adapter 105. The call state manager 103 sends 204 a monitor message that indicates to monitor the alpha-numeric address of b@xyz.com. The basic SIP adapter 105 receives the monitor message sent in step 204. The call state manager 103 sends 205 a monitor message that indicates to monitor the numeric address of 1002. The basic SIP adapter 105 receives the monitor message sent in step 205. The application 101 is now ready to monitor the basic SIP device 109.

The application 101 sends 206 a request to monitor the advanced SIP device 110 (c@xyz.com). The call state manager 103 receives the request to monitor the advanced SIP device 110. The call state manager 103 sends 207 the request to monitor c@c.xyz.com to the advanced SIP adapter 106. The call state manager 103 sends 211 the request to monitor 1003 to the advanced SIP adapter 106. The advanced SIP adapter 106 sends 208 a subscribe message to the advanced SIP device 110 so events in the advanced SIP device 110 will be to the advanced SIP adapter 106. The advanced SIP device 110 sends 209 a 200 OK message to the advanced adapter 106. The advanced SIP device 110 sends 210 a notify (idle) message to the advanced SIP adapter 106. The steps 208-210 are repeated for the second monitor request sent in step 211. The application 101 is now ready to monitor the advanced SIP device 110 for both the numeric address (1003) and the alpha-numeric address (c@xyz.com), based on standard SIP protocols.

Figure 3:
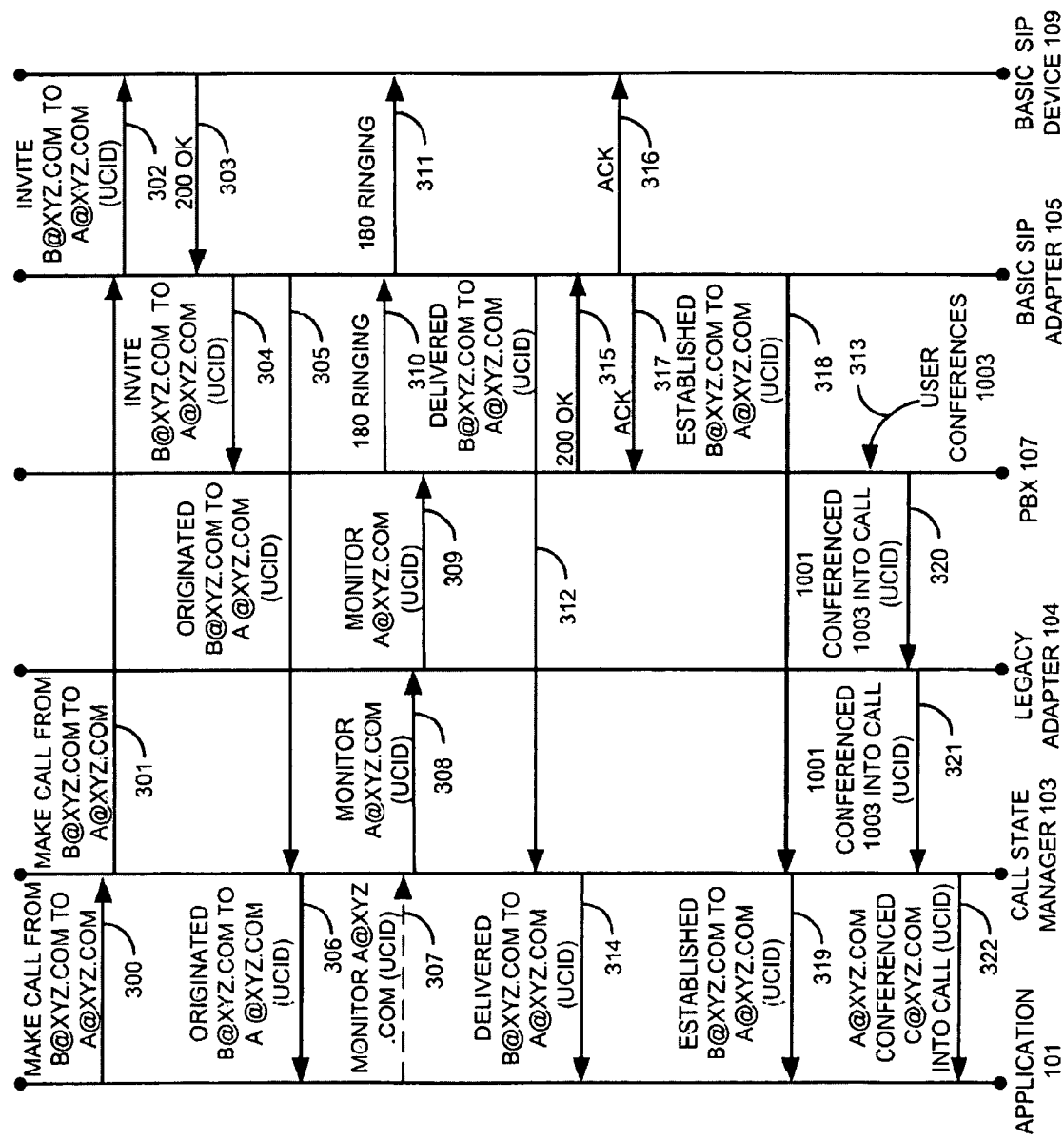
FIG. 3 is a flow diagram of a method for detecting changes in call state in a legacy device based on a request to monitor a basic SIP device.

FIG. 3 is a flow diagram of a method for detecting changes in call state in a legacy device 108 based on a request to monitor a basic SIP device 109. After the application 101 has sent the request to monitor the basic SIP device 109 (steps 203-205), the application 101 sends 300 a make call request to establish a call between b@xyz.com and a@xyz.com. The make call request is received at the call state manager 103. The call state manager 103 sends 301 the make call request to the basic SIP adapter 105. The basic SIP adapter 105 generates a UCID for the call from b@xyz.com to a@xyz.com. The basic SIP adapter 105 sends 302 a SIP INVITE for the call between b@xyz.com and a@xyz.com to the basic SIP device 109. The SIP INVITE in step 302 includes the UCID. The basic SIP device 109 sends 303 a 200 OK message to the basic SIP adapter 105 to acknowledge the SIP INVITE.

The basic SIP adapter 105 sends 304 a SIP INVITE for the call between b@xyx.com and a@xyz.com with the UCID to the PBX 107. The basic SIP adapter 105 reports 305 a change in the call state by sending an originated message for the call between b@xyz.com and a@xyz.com with the UCID to the call state manager 103. The call state manager 103 sends 306 the originated message with the UCID to the application 101. The call state manager 103 optionally can obtain the UCID to use in step 308 from the originated message. The application 101 may optionally (signified by the dashed line) send 307 a request to monitor the legacy device 108 (a@xyz.com) using the UCID to the call state manager 103. However, the call state manager 103 may just generate the request to monitor the legacy device 108 without the application 101 sending the request to monitor the legacy device 108 in step 307. The call state manager 103 sends 308 the request to monitor the legacy device 108 with the UCID to the legacy adapter 104. The legacy adapter 104 sends 309 the request to monitor the legacy device 108 with the UCID to the PBX 107. At this point, both the PBX 107 and the basic SIP adapter 105 are configured to report any change in call state of the legacy device 108 and the basic SIP device 109 using the UCID.

The PBX 107 sends 310 a 180 ringing message to the basic SIP adapter 105. The basic SIP adapter 105 sends 311 the ringing message to the basic SIP device 109. The basic SIP adapter 105 reports 312 a change in the call state by sending a delivered b@xyz.com to a@xyz.com message with the UCID to the call state manager 103. Likewise, the PBX 107 would send a corresponding delivered b@xyz.com to a@xyz.com message (not shown for brevity) with the UCID to the call state manager 103 via the legacy adapter 104. The call state manager 103 can filter and not send the duplicate delivered message to the application 101. The call state manager 103 can obtain the UCID from the delivered message. The call state manager 103 reports 314 by sending the delivered message with the UCID to the application 101.

The PBX 107 sends 315 a 200 OK message to the basic SIP adapter 105. The basic SIP adapter 105 sends 316 an ACK to the basic SIP device 109. The basic SIP adapter 105 sends 317 an ACK to the PBX 107. After the basic SIP adapter 105 detects a change in the call state that the call is established, the basic SIP adapter 105 reports 318 by sending an established b@xyz.com to a@xyz.com message with the UCID to the call state manager 103. Likewise, the PBX 107 would send a corresponding established message (not shown for brevity) to the call state manager 103 via the legacy adapter 104. The call state manager 103 can filter and not send a duplicate established message to the application 101. The call state manager 103 can obtain the UCID from the established message. The call state manager 103 reports 319 the change in the call state by sending the established message with the UCID to the application 101.

The user of the legacy device 108 (extension 1001) conferences 313 the advanced SIP device 110 (extension 1003) into the call with the basic SIP device 109. The PBX 107 detects the change in call state (conference) in the legacy device 108 and reports 320 the change in the call state to the legacy adapter 104 by sending a conferenced 1001 to 1003 message with the UCID. The legacy adapter 104 reports 321 the change in call state (conference) by sending the conferenced message with the UCID to the call state manager 103. The call state manager 103 translates the numeric addresses to the alphanumeric addresses. The call state manager 103 reports 322 the change in state (conferenced) by sending the conferenced message to the application 101 using the alphanumeric addresses of the legacy device 108 and the advanced SIP device 110. The application 101 has been notified of a change in call state in the legacy device 108 (legacy device 108 conferenced the advanced SIP device 110) by only monitoring the basic SIP device 109. After the advanced SIP device 110 has conferenced into the call, the call state manager 103 can generate a monitor c@xyz.com request like the one shown in step 308 and monitor the call state of the advanced SIP device 110.

Figure 4:
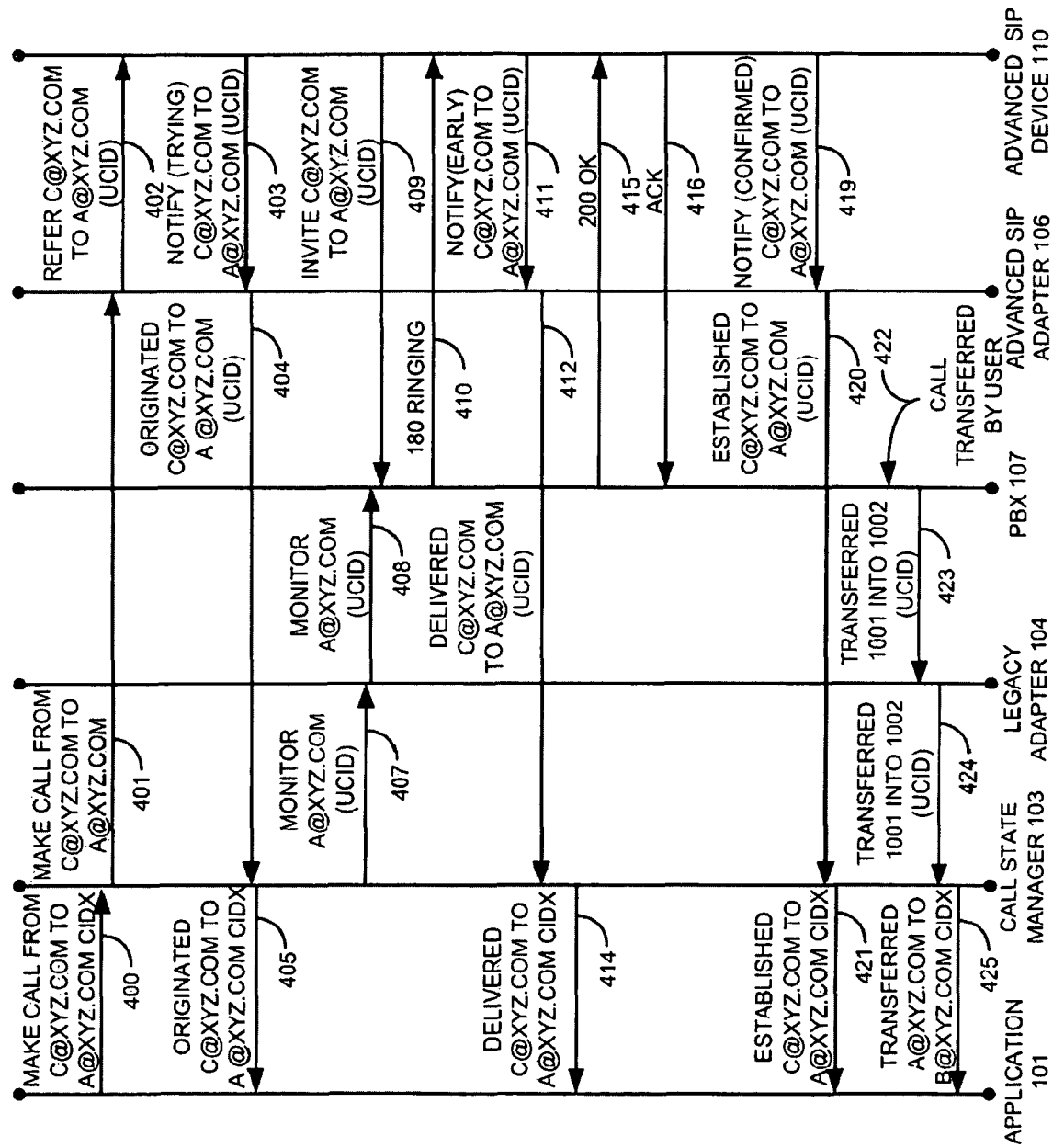
FIG. 4 is a flow diagram of a method for detecting changes in call state in a legacy device based on a request to monitor an advanced SIP device.

FIG. 4 is a flow diagram of a method for detecting changes in call state in a legacy device 108 based on a request to monitor an advanced SIP device 110. After the application 101 has sent the request to monitor the advanced SIP device 110 (steps 206-210), the application 101 sends 400 a request for c@xyz.com to call a@xyz.com. The make call request is received at the call state manager 103. The call state manager 103 sends 401 the make call request to the advanced SIP adapter 106. The advanced SIP adapter 106 generates the UCID. The advanced SIP adapter sends 402 a refer c@xyz.com to a@xyz.com message with the UCID to the advanced SIP device 110. After attempting to call a@xyz.com, the advanced SIP adapter 110 sends 403 a notify (trying) c@xyz.com, to a@xyz.com message with the UCID to the advanced SIP adapter 106. The advanced SIP adapter 106 sends 404 an originated c@xyz.com to a@xyz.com message with the UCID to the call state manager 103. The call state manager 103 can obtain the UCID from the originated message to use in step 407. The call state manager 103 sends 405 the originated message to the application 101 with the call ID of X (CIDX). The CIDX allows the application 101 to keep track of all messages associated with the call between c@xyz.com and a@xyz.com. The CIDX can be any type of identifier that the call state manager 103 passes to the application to identify the call.

Based on the call originated between c@xyz.com and a@xyz.com, the call state manager 103 generates a request to monitor the legacy device 108. The call state manager 103 sends 407 the request to monitor the legacy device 108 with the UCID to the legacy adapter 104. The legacy adapter 104 sends 408 the request to monitor the legacy device with the UCID to the PBX 107.

The advanced SIP device 110 sends 409 a SIP INVITE to connect c@xyz.com to a@xyz.com using the UCID. The PBX 107 sends 410 a 180 ringing message to the advanced SIP device 110. The advanced SIP device 110 sends 411 a notify (early) c@xyz.com to a@xyz.com message with the UCID to the advanced SIP adapter 106. The advanced SIP adapter 106 sends 412 a delivered c@xyz.com to a@xyx.com message with the UCID to the call state-manager 103. Likewise, the PBX 107 would send a delivered c@xyz.com to a@xyz.com message, (not shown for brevity) to the call state manager 103. The call state manager 103 can obtain the UCID from the delivered message. The call state manager 103 sends 414 the delivered message with CIDX to the application 101.

The PBX 107 sends 415 a 200 OK message to the advanced SIP device 110. The advanced SIP device 110 sends 416 an ACK message to the PBX 107. Upon establishment of a call at the legacy device 108, the PBX 107 would send an established c@xyz.com to a@xyz.com message (not shown for brevity) with the UCID to the call state manager 103. The call state manager 103 can obtain the UCID from the established message. The reason why the established message in step 418 is optional is because a second established message is sent in step 421. Either one of these established messages notifies the application 101 of the establishment of the call between c@xyz.com and a@xyz.com.

Upon establishment of a call at the advanced SIP device 110, the advanced SIP device 110 sends 419 a notify (confirmed) c@xyz.com to a@xyz.com message with the UCID to the advanced SIP adapter 106. The advanced SIP adapter 106 sends 420 the established message with the UCID to the call state manager 103. The call state manager 103 can obtain the UCID from the notify (confirmed) message. The call state manager 103 sends 421 the established c@xyz.com to a@xyz.com with the CIDX to the application 101.

The call at the legacy device 108 is transferred 422 by the user to the basic SIP device 109. The PBX 107 reports the change in call state by sending 423 a transferred 1001 to 1002 message with the UCID to the legacy adapter 104. The legacy adapter 104 reports the change in call state by sending 424 the transferred message with the UCID to the call state manager 103. The call state manager 103 translates the numeric addresses to alphanumeric addresses and reports 425 the change in call state by sending a transferred a@xyz.com to b@xyz.com message with the CIDX to the application 101.

The application 101 is now aware of the change in call state in the legacy device 108 even though the application only requested to monitor the advanced SIP device 110. After the call is transferred to the basic SIP device 109, the call state manager 103 can send a monitor message as described in steps 203-205 to monitor the basic SIP device 109 to keep track of the transferred call between the basic SIP device 109 and the advanced SIP device 110.

Figure 5:
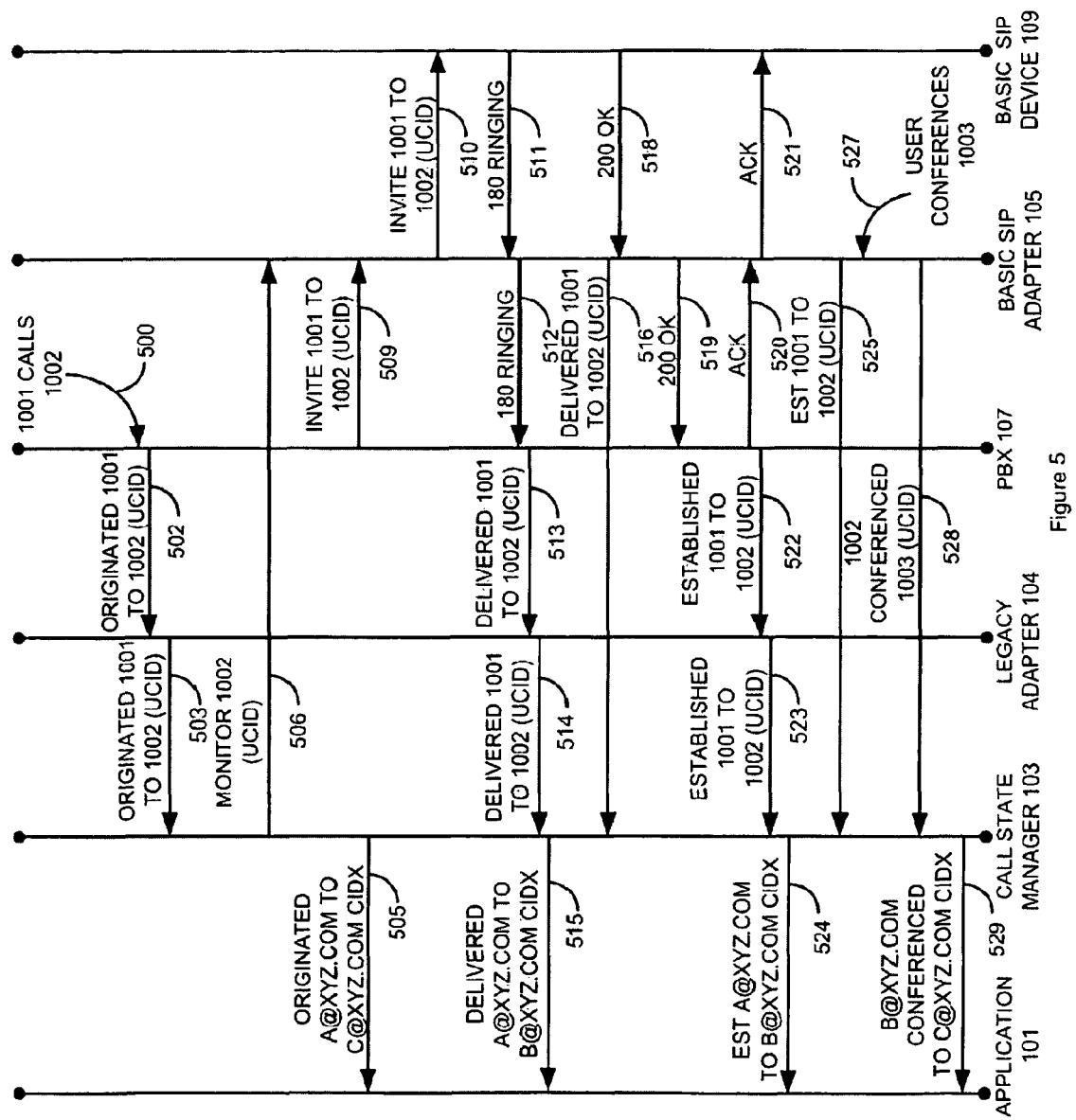
FIG. 5 is a flow diagram of a method for detecting changes in call state in a basic SIP device based on a request to monitor a legacy device.

FIG. 5 is a flow diagram of a method for detecting changes in call state in a basic SIP device 109 based on a request to monitor a legacy device 108. After a request to monitor the legacy device 108 as described in steps 200-202 is sent from the application 101, the user at the legacy device 108 (extension 1001) calls 500 the basic SIP device 109 (extension 1002). A request to establish a call between the legacy device 108 and the basic SIP device 108 is received at the PBX 107. The PBX 107 generates the UCID. The PBX sends 502 an originated 1001 to 1002 message with the UCID to the legacy adapter 104. The legacy adapter 104 sends 503 the originated message with the UCID to the call state manager 103. The call state manager 103 can obtain the UCID from the originated message to use in step 506. The call state manager 103 generates and sends 506 a monitor 1002 message with the UCID to the basic SIP adapter 105.

The PBX 107 sends 509 a SIP INVITE 1001 to 1002 with the UCID to the basic SIP adapter 105. The basic SIP adapter 105 sends 510 the SIP INVITE with the UCID to the basic SIP device 109. The basic SIP device 109 sends 511 a 180 ringing message to the basic SIP adapter 105. The basic SIP adapter 105 sends 512 the 180 ringing message to the PBX 107. The PBX 107 sends 513 a delivered 1001 to 1002 message with the UCID to the legacy adapter 104. The legacy adapter 104 sends 514 the delivered message with the UCID to the call state manager 103. The call state manager 103 can obtain the UCID from the delivered message. The call state manager 103 sends 515 the delivered message with the CIDX to the application 101.

The basic SIP adapter 105 sends 516 a delivered 1001 to 1002 message with the UCID to the call state manager 103. The call state manager 103 filters the delivered message sent in step 516 and does not send a delivered message to the application 101. The basic SIP device 109 sends 518 a 200 OK message to the basic SIP adapter 105. The basic SIP adapter 105 sends 519 the 200 OK message to the PBX 107. The PBX 107 acknowledges the 200 OK by sending 520 an ACK to the basic SIP adapter 105. The basic SIP adapter 105 sends 521 the ACK to the basic SIP device 109.

The PBX 107 sends 522 an established 1001 to 1002 message with the UCID to the legacy adapter 104. The legacy adapter 104 sends 523 the established message with the UCID to the call state manager 103. The call state manager 103 can obtain the UCID from the established message. The call state manager 103 translates the numeric addresses to alphanumeric addresses. The call state manager 103 sends 524 the established a@xyz.com to b@xyz.com message with the CIDX to the application 101. The basic SIP adapter 105 sends 525 an established 1001 to 1002 message with the UCID to the call state manager 103. The call state manager 103 can obtain the UCID from the established message. The call state manager 103 filters the established message and does not send the established message to the application 101.

A user conferences 527 the advanced SIP device 110 (extension 1003) into the call between the basic SIP device 109 (extension 1002) and the legacy device 108 (extension 1001). The basic SIP adapter 105 reports 528 the change in call state by sending a 1002 conferenced 1003 message with the UCID to the call state manager 103. The call state manager 103 translates the numeric addresses to alphanumeric addresses. The call state manager 103 reports the change in call state by sending 529 the b@xyz.com conferenced c@xyz.com message with the CIDX to the application 101. The application 101 has now been notified of a change in call state (conference of advanced SIP device 110) in the basic SIP device 109 while only requesting to monitor the legacy device 108. A similar process can be used to notify the application when the advanced SIP device 110 drops out of the conference call.

Figure 6:
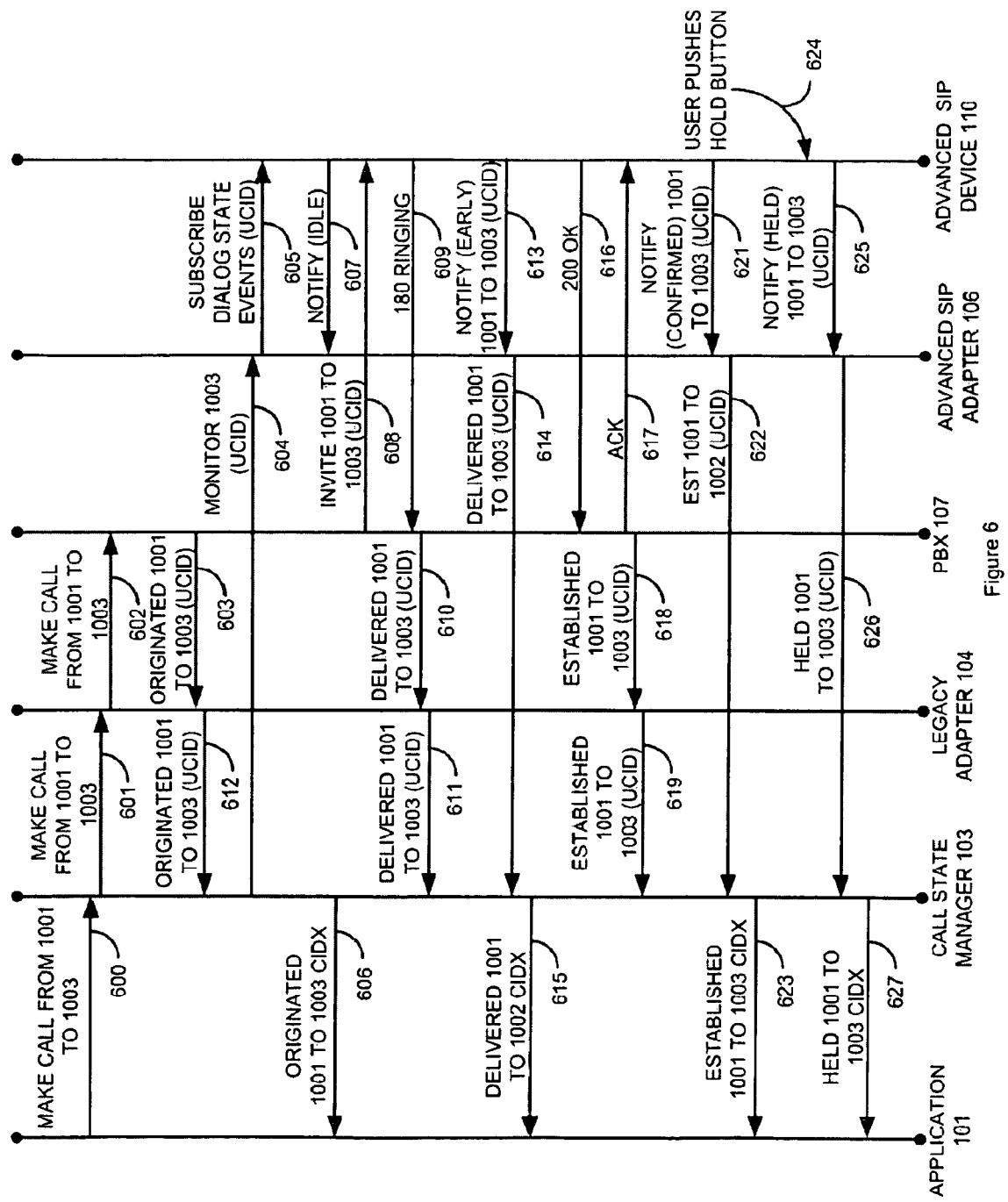
FIG. 6 is a flow diagram of a method for detecting changes in call state in an advanced SIP device based on a request to monitor a legacy device.

FIG. 6 is a flow diagram of a method for detecting changes in call state in an advanced SIP device 110 based on a request to monitor a legacy device 108. After a request to monitor the legacy device 108 as described in steps 200-202 is sent from the application 101, the application 101 sends 600 a make call request to establish a call from the legacy device 108 (extension 1001) to the advanced SIP device 110 (extension 1003). The call state manager 103 receives the make call request. The call state manager 103 sends 601 the make call request to the legacy adapter 104. The legacy adapter 104 sends 602 the make call request to the PBX 107.

The PBX 107 generates the UCID. The PBX sends 603 an originated 1001 to 1003 message with the UCID to the legacy adapter 104. The legacy adapter 104 sends 612 the originated message with the UCID to the call state manager 103. The call state manager 103 can obtain the UCID from the originated message to use in step 604. The call state manager 103 sends 606 the originated message to the application 101 with the CIDX. The call state manager 103 generates a request to monitor the advanced SIP device 110 (extension 1003) using the UCID and sends 604 the monitor message to the advanced SIP adapter 106. The advanced SIP adapter 106 sends 605 a subscribe dialog state events message with the UCID to the advanced SIP device 110. The advanced SIP device 110 sends 607 a notify (idle) message to the advanced SIP adapter 106.

The PBX 107 sends 608 a SIP INVITE 1001 to 1003 with the UCID to the advanced SIP device 110. The advanced SIP device 110 sends 609 a 180 ringing message to the PBX 107. The PBX 107 sends 610 a delivered 1001 to 1003 message with the UCID to the legacy adapter 104. The legacy adapter 104 sends 611 the delivered message with the UCID to the call state manager 103. The advanced SIP device 110 sends 613 a notify (early) 1001 to 1003 message with the UCID to the advanced SIP adapter 106. The advanced SIP adapter 106 sends 614 a delivered 1001 to 1003 message with the UCID to the call state manager 103. The call state manager 103 can obtain the UCID from the delivered message. The call state manager 103 sends 615 the delivered message with the CIDX to the application 101. The delivered message sent by the call state manager 103 in step 615 could optionally be sent after the call state manager 103 receives the delivered 1001 to 1003 message in step 611 instead of after receiving the delivered message in step 614.

The advanced SIP device 110 sends 616 a 200 OK message to the PBX 107. The PBX 107 acknowledges the 200 OK by sending 617 an ACK message to the advanced SIP device 110. The PBX 107 sends 618 an established 1001 to 1003 message With the UCID to the legacy adapter 104. The legacy adapter 104 sends 619 the established message with the UCID to the call state manager 103. The advanced SIP device 110 sends 621 a notify (confirmed) 1001 to 1003 message With the UCID to the advanced SIP adapter 106. The advanced SIP adapter 106 sends 622 the established message with the UCID to the call state manager 103. The call state manager 103 can obtain the UCID from the established message. The call state manager 103 sends 623 the established message with the CIDX to the application 101. The established message sent by the call state manager 103 in step 623 could be optionally sent after the call state manager 103 receives the established message in step 619 instead of after receiving the established message sent in step 622.

A user pushes 624 a hold button on the advanced SIP device 110. The advanced SIP device 110 sends 625 a notice of a change in call state by sending a notify (held) 1001 to 1003 with the UCID to the advanced SIP adapter 106. The advanced SIP adapter 106 sends 626 the change in call state by sending the held message with the UCID to the call state manager 103. The call state manager 103 sends 627 the change in call state by sending the held message with the CIDX to the application 101. The application 101 has now been notified of the change in call state (hold of call between legacy device 108 and the advanced SIP device 110) of the advanced SIP 110 device while monitoring the legacy device 108. This process will work in like manner when the call from the legacy device 108 to the advanced SIP device 110 is taken off hold.

Figure 7:
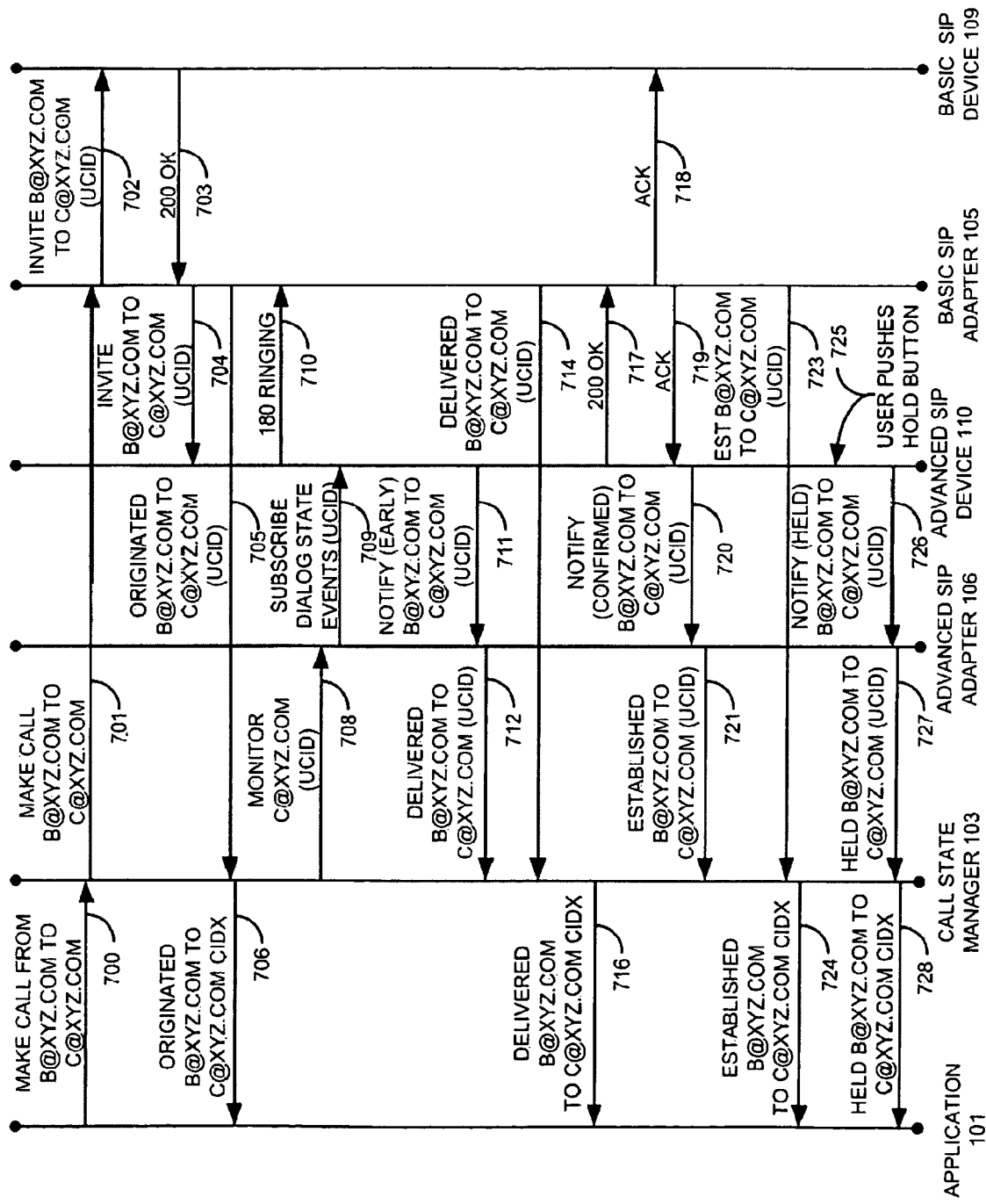
FIG. 7 is a flow diagram of a method for detecting changes in call state in an advanced SIP device based on a request to monitor a basic SIP device.

FIG. 7 is a flow diagram of a method for detecting changes in call state in an advanced SIP device 110 based on a request to monitor a SIP basic device 108. After a request to monitor the basic SIP device 109 as described in steps 203-205 is sent from the application 101, the application 101 sends 700 a make call request to establish a call from the basic SIP device 109 (b@xyz.com) to the advanced SIP device 110 (c@xyz.com). The call state manager 103 receives the make call request. The call state manager 103 sends 701 the make call request to the basic SIP adapter 105.

The basic SIP adapter generates the UCID. The basic SIP adapter 105 sends 702 a SIP INVITE b@xyz.com to c@xyz.com with the UCID to the basic SIP device 109. The basic SIP device 109 acknowledges the SIP INVITE by sending 703 a 200 OK message to the basic SIP adapter 105. The basic SIP adapter 105 sends 704 a SIP INVITE b@xyz.com to c@xyz.com with the UCID to the advanced SIP device 110. The basic SIP adapter 105 sends 705 an originated b@xyz.com to c@xyz.com message with the UCID to the call state manager 103. Based on the SIP INVITE in step 704, the advanced SIP device 110 sends 710 a 180 ringing message to the basic SIP adapter 109. The call state manager 103 can obtain the UCID from the originated message to use in step 708. The call state manager 103 sends 706 the originated message with the CIDX to the application 101.

The call state manager 103 generates a request to monitor the advanced SIP device 110 and sends 708 the request to monitor the advanced SIP device 110 to the advanced SIP adapter 106. The advanced SIP adapter 106 sends 709 a subscribe dialog state events message with the UCID to the advanced SIP device 110. The advanced SIP device 110 sends 711 a notify (early) b@xyz.com to c@xyz.com message with the UCID to the advanced SIP adapter 106. The advanced SIP adapter 106 sends 712 a delivered b@xyz.com to c@xyz.com message with the UCID to the call state manager 103. The basic SIP adapter 105 sends 714 a delivered b@xyz.com to c@xyz.com message with the UCID to the call state manager 103. The call state manager 103 can obtain the UCID from the delivered message. The call state manager 103 sends 716 the delivered message with the CIDX to the application 101. The call state manager 103 could optionally send the delivered message in step 716 after the call state manager 103 receives the delivered message in step 712 instead of after receiving the delivered message in step 714.

The advanced SIP device 110 sends 717 a 200 OK message to the basic SIP adapter 105. The basic SIP adapter 105 sends 718 an ACK to the basic SIP device 109. The basic SIP adapter 105 sends 719 an ACK to the advanced SIP device 110. The advanced SIP device 110 sends 720 a notify (confirmed) b@xyz.com to c@xyz.com with the UCID to the advanced SIP adapter 106. The advanced SIP adapter 106 sends 721 an established b@xyz.com to c@xyz.com with the UCID to the call state manager 103. The basic SIP adapter 105 sends 723 an established b@xyz.com to c@xyz.com message with the UCID to the call state manager 103. The call state manager 103 can obtain the UCID from the established message. The call state manager 103 sends 724 the established message with the CIDX to the application 101. The call state manager 103 could optionally send the established message in step 724 after the call state manager 103 receives the established message in step 721 instead of after receiving the established message in step 723.

A user pushes 725 a hold button on the advanced SIP device 110. The advanced SIP device 110 sends 726 a notice of a change in call state by sending a notify (held) b@xyz.com to c@xyz.com with the UCID to the advanced SIP adapter 106. The advanced SIP adapter 106 sends 727 the change in call state by sending the held message with the UCID to the call state manager 103. The call state manager 103 sends 728 the change in call state by sending the held message with the CIDX to the application 101. The application 101 has now been notified of the change in call state (hold of call between basic SIP device 109 and the advanced SIP device 110) of the advanced SIP 110 device while monitoring the basic SIP device 109. This process will work in like manner when the call from the basic SIP device 109 to the advanced SIP device 110 is taken off hold.

Figure 8:
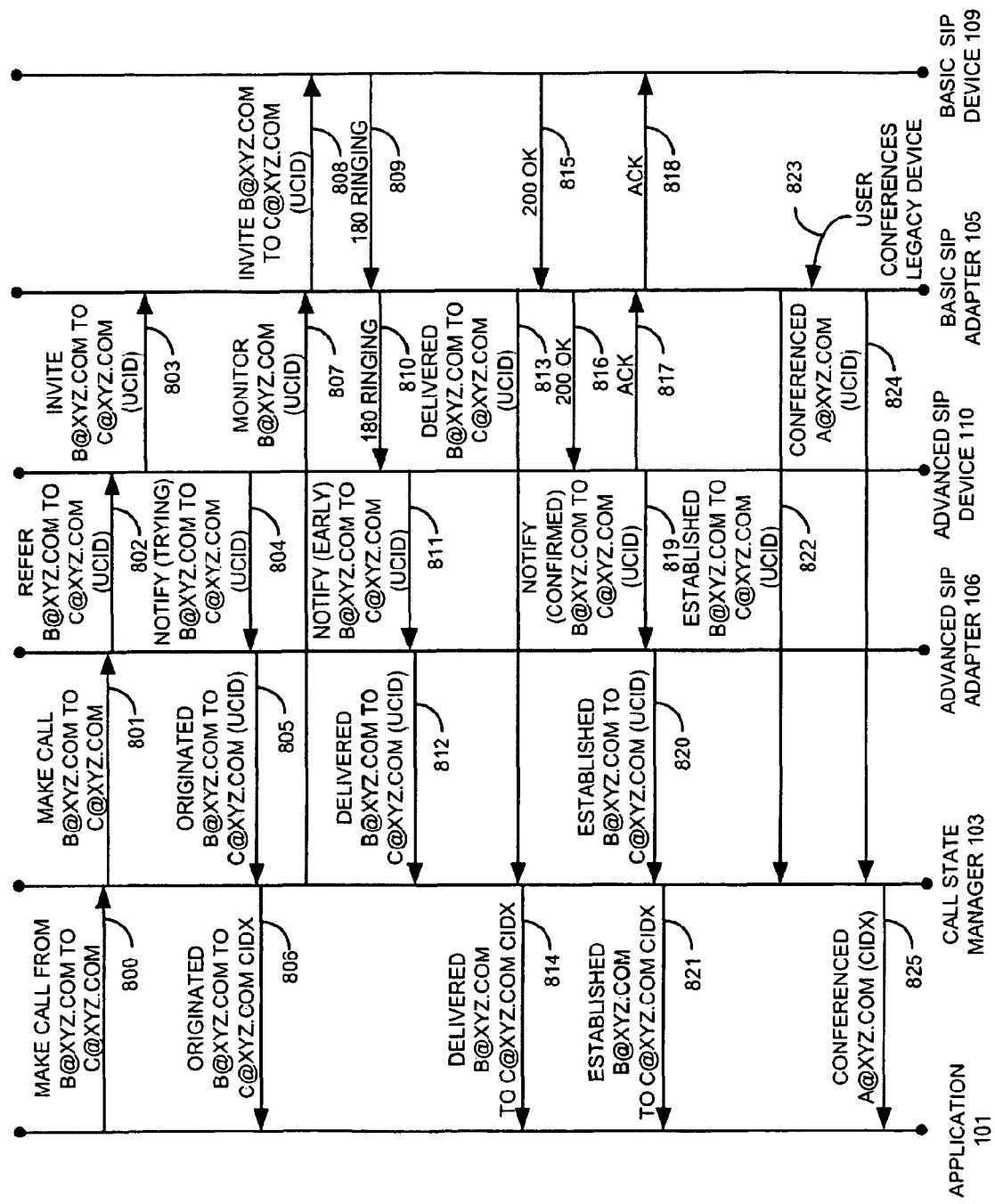
FIG. 8 is a flow diagram of a method for detecting changes in call state in a basic SIP device based on a request to monitor an advanced SIP device.

FIG. 8 is a flow diagram of a method for detecting changes in call state in a basic SIP device 109 based on a request to monitor an advanced SIP device 110. After a request to monitor the advanced SIP device 110 as described in steps 206-210 is sent from the application 101, the application 101 sends 800 a make call request to establish a call from the basic SIP device 109 (b@xyz.com) to the advanced SIP device 110 (c@xyz.com). The call state manager 103 receives the make call request from the application 101. The call state manager 103 sends 801 the make call request to the advanced SIP adapter 106. The advanced adapter 106 generates the UCID. The advanced adapter 106 sends 802 a refer b@xyz.com to c@xyz.com with the UCID to the advanced SIP device 110.

The advanced SIP device 110 sends 803 a SIP INVITE b@xyz.com to c@xyz.com message with the UCID to the basic SIP adapter 105. The advanced SIP device 110 sends 804 a notify (trying) b@xyz.com to c@xyz.com message with the UCID to the advanced SIP adapter 106. The advanced adapter 106 sends 805 an originated b@xyz.com to c@xyz.com message with the UCID to the call state manager 103. The call state manager 103 obtains the UCID from the originated message to use in step 807. The call state manager 103 sends 806 the originated message with the CIDX to the application 101. The call state manager 103 sends 807 a monitor b@xyz.com message with the UCID to the basic SIP adapter 105. The basic SIP adapter 105 sends 808 a SIP INVITE b@xyz.com to c@xyz.com with the UCID to the basic SIP device 109.

The basic SIP device 109 sends 809 a 180 ringing message to the basic SIP adapter 105. The basic SIP adapter 105 sends 810 the 180 ringing message to the advanced SIP device 110. The advanced SIP device 110 sends 811 a notify (early) b@xyz.com to c@xyz.com message with the UCID to the advanced SIP adapter 106. The advanced SIP adapter 106 sends 812 a delivered b@xyz.com to c@xyz.com with the UCID to the call state manager 103. The basic SIP adapter 105 sends 813 a delivered b@xyz.com to c@xyz.com message with the UCID to the call state manager 103. The call state manager 103 obtains the UCID from the delivered message. The call state manager sends 814 the delivered message to the application 101.

The basic SIP device 109 sends 815 a 200 OK message to the basic SIP adapter 105. The basic SIP adapter 105 sends 816 the 200 OK message to the advanced SIP device 110. The advanced SIP device 110 sends 817 an ACK to the basic SIP adapter 105. The basic SIP adapter 105 sends 818 the ACK to the basic SIP device 109. The advanced SIP device 110 sends 819 a notify (confirmed) b@xyz.com to c@xyz.com message with the UCID to the advanced SIP adapter 106. The advanced SIP adapter 106 sends 820 an established b@xyz.com to c@xyz.com message with the UCID to the call state manager 103. The basic SIP adapter 105 will also send an established event (not shown for brevity) to the call state manager 103. The call state manager 103 obtains the UCID from the established message. The call state manager 103 sends 821 the established message with the CIDX to the application 101.

The user of the basic SIP adapter 109 conferences 823 the legacy device 108 (a@xyz.com). The basic SIP adapter 105 sends 824 a conferenced a@xyz.com message with the UCID to the call state manager 103. The call state manager 103 sends the conferenced message with the CIDX to the application 101. The application 101 has now been notified of the change in call state (conference of the legacy device 108) of the basic SIP device 108 while monitoring the advanced SIP device 110.

Of course, various changes and modifications to the illustrative embodiment described above will be apparent to those skilled in the art. For example, there could be more adapters for different types of devices and networks. The adapters could form a single module and there could be different types of APIs. These changes and modifications can be made without departing from the spirit and the scope of the system and method and without diminishing its attendant advantages. It is therefore intended that such changes and modifications be covered by the following claims except insofar as limited by the prior art.

What is claimed is:

1. A system for monitoring a call flow comprising:
   a. a call state manager configured to receive a request from an application to monitor a first device, obtain a Universal Call Identifier for a call between the first device and a second device, send a request to monitor the second device using the Universal Call Identifier, receive a notice of a change in a call state of the second device, and report the change in the call state of the second device to the application based on the Universal Call Identifier; and
   b. at least one adapter configured to receive a notification to establish the call between the first device and the second device;
   c. wherein the first device and the second device use different call identifiers for the call.

2. The system of claim 1, wherein the change in call state of the second device is an item selected from the group comprising: conferencing a third device into the call from the second device, disconnecting the third device from the conference, forwarding the call from the second device to the third device, transferring the call from the second device to the third device, placing the call on hold from the second device, and taking the call off hold from the second device.

3. The system of claim 1, wherein the call state manager is configured to monitor one or more additional devices that are conference into the call.

4. The system of claim 1, wherein the first device is a legacy device selected from the group comprising: an analog telephone, an analog mode, an Integrated Services Digital Network device, an Integrated Services Digital Network telephone, a digital telephone, and a Digital Communication Protocol device.

5. The system of claim 1, wherein the notification to establish the call between the first device and the second device includes at least one combination of addresses selected from the group comprising: two alphanumeric addresses, two numeric addresses, and one alphanumeric address and one numeric address.

6. The system of claim 1, wherein the request to monitor the first device contains an item selected from the group comprising: an alphanumeric address and a numeric address.

7. The system of claim 1, wherein the call state manager is configured to obtain the Universal Call Identifier from an item selected from the group comprising: an originated message, an established message, a Session Initiation Protocol established message, a delivered message, a transferred message, a conference message, a held message, and a Session Initiation Protocol delivered message.

8. The system of claim 1, wherein the call is originated by an item selected from the group comprising: the first device, the second device, a third device, and the application.

9. The system of claim 1, wherein the call state manager is configured to filter duplicate messages which result from monitoring the second device.

10. The system of claim 1, wherein the call state manager is configured to receive a request to monitor the second device.

11. A computer-implemented method for monitoring a call flow comprising:
    a. receiving a request from an application to monitor a first device;
    b. receiving a notification to establish a call between the first device and a second device, wherein the first device and the second device use different call identifiers for the call;
    c. obtaining a Universal Call Identifier for the call between the first device and the second device;
    d. establishing the call between the first device and the second device using the Universal Call Identifier;
    e. sending a request to monitor the second device using the Universal Call Identifier;
    f. receiving a notice of a change in a call state of the second device; and
    g. reporting the change in the call state of the second device to the application based on the Universal Call Identifier.

12. The method of claim 11, wherein the change in call state of the second device is an item selected from the group comprising: conferencing a third device on to the call from the second device, disconnecting the third device from the conference, forwarding the call from the second device to the third device, placing the call on hold from the second device, and taking the call off hold from the second device.

13. The method of claim 11, wherein reporting the change in the call state of the second device further comprises the step of: sending a request to monitor one or more additional devices that are conference into the call.

14. The method of claim 11, wherein the first device is a legacy device selected from the group comprising: an analog telephone, an analog modem, and Integrated Services Digital Network device, an Integrated Services Digital Network telephone, a digital telephone, and a Digital Communication Protocol device.

15. The method of claim 11, wherein the notification to establish the call between the first device and the second device uses at least one combination of addresses selected from the group comprising: two alphanumeric addresses, two numeric addresses, and one alphanumeric address and one numeric address.

16. The method of claim 11, wherein the request to monitor the first device contains an item selected from the group comprising: an alphanumeric address and a numeric address.

17. The method of claim 11, wherein the step of reporting the change in the call state of the second device to the application based on the Universal Call Identifier further comprises the step of: obtaining the Universal Call Identifier from an item selected from the group comprising: an originated message, an established message, a Session Initiation Protocol established message, a delivered message, a transferred message, a conference message, a held message, and a Session Initiation Protocol delivered message.

18. The method of claim 11, wherein the call is originated by an item selected from the group comprising: the first device, the second device, a third device, and the application.

19. The method of claim 11, further comprising the step of: filtering duplicate messages which result from monitoring the second device.

20. The method of claim 11, further comprising the step of: receiving a request to monitor the second device from an application.

21. An apparatus for monitoring a call flow comprising:
   a. means for receiving a request from an application to monitor a first device;
   b. means for establishing a call between the first device and a second device by using a Universal Call Identifier, wherein the first device and the second device use different call identifiers to identify the call;
   c. means for obtaining the Universal Call Identifier for the call between the first device and the second device;
   d. means for sending a request to monitor the second device using the Universal Call Identifier;
   e. means for receiving a notice of a change in a call state of the second device; and
   f. means for reporting the change in the call state of the second device to the application based on the Universal Call Identifier.

22. A system for monitoring a call flow comprising:
   a. a call state manager configured to receive a request from an application to monitor a first device, obtain a Universal Call Identifier for a call between the first device and a second device, send a request to monitor the second device using the Universal Call Identifier, receive a request to conference a third device into the call, receive a notice of a change in a call state of the second device, report the change in the call state of the second device to the application based on the Universal Call Identifier, and generate a request to monitor the third device; and
   b. at least one adapter configured to establish the call between the first device and the second device;
   c. wherein the first device and the second device use a different call identifier to identify the call.

23. A computer-implemented method for monitoring a call flow comprising:
   a. receiving a request form an application to monitor a first device;
   b. receiving a request to establish a call between the first device and a second device, wherein the first device and the second device use a different call identifier to identify the call;
   c. obtaining a Universal Call Identifier for the call between the first device and the second device;
   d. establishing the call between the first device and the second device using the Universal Call Identifier;
   e. sending a request to monitor the second device using the Universal Call Identifier;
   f. conferencing a third device into the call from the second device;
   g. receiving a notice of a change in a call state from the second device;
   h. reporting the change in the call state of the second device to the application based on the Universal Call Identifier; and
   i. sending a request to monitor the third device.

* * * * *